March 10, 1931. F. J. DULTMEIER 1,796,091
CONVERTING ATTACHMENT
Filed Nov. 10, 1927
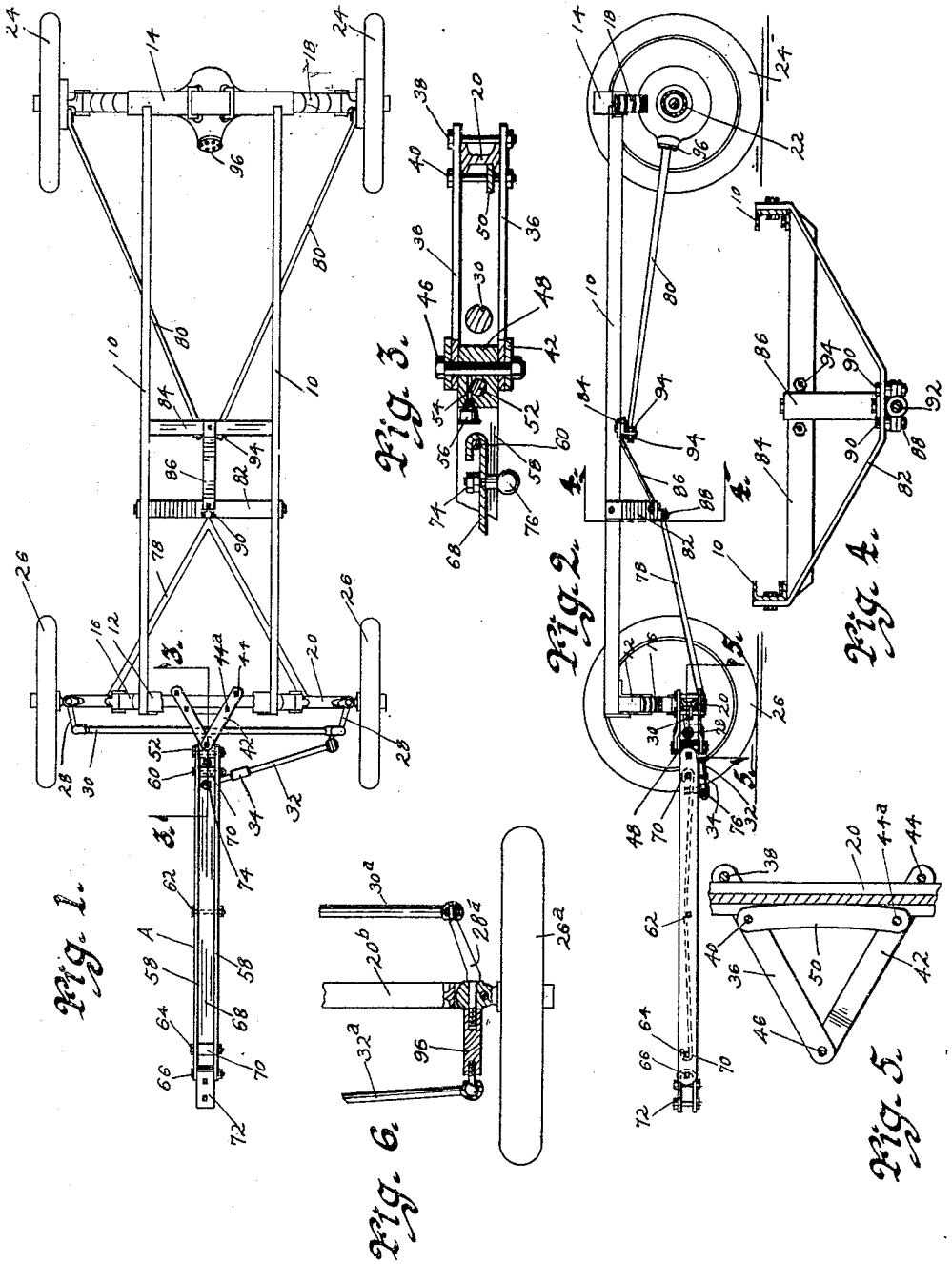
Witness
C. J. Dykstra
Inventor
Frank J. Dultmeier
by Bair & Freeman Attorneys Patented Mar. 10, 1931

1,796,091

UNITED STATES PATENT OFFICE

FRANK J. DULTMEIER, OF POCAHONTAS, IOWA

CONVERTING ATTACHMENT

Application filed November 10, 1927. Serial No. 232,321.

The object of my invention is to provide a converting attachment of very simple and inexpensive construction for converting old automobile chassis such as that of a Ford or other automobile, into a trailer or wagon.

More particularly it is my object to provide such a converting attachment which can be quickly and easily connected to an automobile chassis for the purposes mentioned.

It is a further and more particular object of my invention to provide in such a converting attachment, means for connecting the front axle with a tongue which may be longer or shorter as may be desired and for connecting the front steerable wheels with the attachment for control by such tongue.

It is also my purpose to provide a convenient means for supporting and connecting the radius rods for such a chassis as that of a Ford.

With these and other objects in view my invention consists in the construction, arrangement and combination of the various parts of my device, whereby the objects contemplated are attained, as hereinafter more fully set forth, pointed out in my claims and illustrated in the accompanying drawings, in which:—

Figure 1 is a top or plan view of an automobile chassis equipped with a converting attachment embodying my invention.

Figure 2 is a detail sectional view taken on the line 2—2 of Figure 1.

Figure 3 is a detail sectional view taken on the line 3—3 of Figure 1.

Figure 4 is a detail sectional view taken on the line 4—4 of Figure 2.

Figure 5 is a detail sectional view taken on the line 5—5 of Figure 2 and

Figure 6 is an enlarged plan view of a portion of a modified form of my converting attachment.

It should perhaps be said that my converting attachment may be used with the chassis of various automobiles but for purposes of illustrating one form in which my device may be used, I have in Figures 1 to 5 inclusive, shown a device as installed in connection with a Ford chassis while in Figure 6 I have shown a modified form used with other motor vehicles.

In the drawings herewith, I have shown a portion of a Ford chassis including the longitudinal channel bar frame members 10 with the transverse frame members 12 and 14. The frame members 12 and 14 are supported in the ordinary way by means of the springs 16 and 18 upon the front axle 20 and the rear axle housing 22 respectively.

The engine and drive shaft are removed. The usual rear wheels 24 are employed as are the front wheels 26. In the case of the installation of my converting attachment on a Ford chassis, the spindles are removed from the front axle and the front wheels are reversed so that the right front wheel is on the left side and the left front wheel on the right side.

The result of this reversal of the front wheels is to cause the spindle arms 28 to extend forwardly and to locate the spindle arm connecting rod 30 in front of the front axle.

I cut out a section of the usual steering arm connecting rod 32 and fasten the remaining parts together by means of a threaded sleeve 34 so as to shorten the rod 32 to the proper length. The chassis is then ready for the installation of my converting attachment.

It is my purpose to provide a converting attachment which can be used in such manner as to control the steerable front wheels 26. I provide an upper and a lower metal strip or bar, these bars being shown at 36 in Figure 3.

The rear ends of the bars 36 are arranged above and below the axle 20 and are mounted on the axle 20 by means of bolts 38 and 40 extending through the straps 36 immediately behind and immediately in front of the axle. The bars or straps 36 are inclined forwardly as shown in Figure 1.

A similar pair of bars 42 shown in Figure 1, are secured at their rear ends to the axle 20 in a similar way by means of bolts 44 and 44a spaced laterally from the rear ends of the bars 36. The bars 42 are inclined forwardly. The bars 36 and 42 converge at their forward end and are connected by means of a bolt 46 extended through them and through a block 48.

The lower bars 36 and 42 are connected by a spacer tow bar 50 mounted on the bolts 40 and 44a. The spacer tow bar 50 is bent at its central portion to engage the central web of the axle 20 above the lower flange thereof to prevent rattling.

Extended through the block 48 in front of the bolt 46 is a transverse bolt 52. The block 48 has extended into it a bore 54 communicating with the bores which receive the respective bolts 52 and 46 and forming a lubricant channel. An ordinary grease cup 56 is mounted on the block 48 in communication with the bore 54.

Mounted on the bolt 52 on opposite sides of the block 48 are bars 58 extended forwardly and forming a portion of a tongue which I have indicated generally by the character A. The bars 58 are also connected by a series of bolts 60, 62, 64 and 66 (see Figure 1).

A flat spacer bar 68 has its ends curled over the bolts 60 and 64 as at 70. A suitable clevis device 72 is mounted on the forward bolt 66. Where my device is used as a trailer, the tongue A is relatively short. It will, of course, be understood that a longer tongue may be employed if it is desired to haul the converted device by means of draft animals.

Mounted in the rear end of the spacer bar 68 is an upper bolt 74 having on its lower end a ball 76 to which the steering arm connecting rod 32 is secured by the usual cap 76 of ordinary construction.

It will be seen that the converted device may be drawn as a trailer by the tongue A but when the tongue A swings to the right or left, the wheels 26 will be guided. When the drive shaft and drive shaft tubing or housing, are removed there arises the necessity of properly supporting the front radius rods 78 and the rear radius rods 80.

For this purpose I mount on the longitudinal frame members 10 a cross yoke 82, the central portion of which stands substantially below the level of the frame members 10 as shown clearly in Figure 4. Rearwardly with relation to the cross yoke 82, I mount a transverse angle bar 84 on the frame members 10. A brace 86 connects the central portions of the cross yoke 82 and the bar 84.

Ordinary radius rod caps 88 are secured to the lower central portion of the cross yoke 82 by means of bolts 90. These caps receive the ball 92 at the rear end of the front radius rod 78 for thus properly supporting the rear ends of those radius rods. The front ends of the rear radius rods 80 are extended through the downwardly extending flange of the cross bar 84 as shown in Figure 2 and have nuts 94 mounted on them for locking the parts in position.

It will thus be seen that I have provided a converting attachment of very simple construction whereby a forward chassis may be made into a trailer or wagon at a moderate expense. There are many of these chassis available and a trailer or wagon can thus be constructed very cheaply.

The resulting construction is strong and rigid. The attachment affords a convenient means for hauling the trailer and the tongue A readily and suitably guides the wheels 26. Suitable lubrication is provided for the bolts 52 and 46 where the greatest wear is likely to occur.

The tongue A is mounted for vertical pivotal movement and for horizontal pivotal movement.

In Figure 6 I have shown a portion of a type of chassis having the front axle 20a and having at one side an arm 96 extending forwardly from one of the spindles. Where such a construction is found in the chassis or where it is desirable to leave the spindle arm connecting rod indicated at 30a behind the axle and to employ a special arm 96, the wheels of course, are not reversed and the rod 32a similar to the rod 32 is connected to the arm 96.

The wheels 26a in the modified form of the device can then be steered in the same way of the wheels 26 otherwise the parts of the front of the chassis are practically the same as has already been described.

It will be obvious that some changes may be made in the details of construction and arrangement of my improved converting attachment without departing from the real spirit and purpose of my invention and it is my intention to cover by my claims any modified forms of structure or use of mechanical equivalents which may be reasonably included within their scope.

I claim as my invention:—

1. In a structure of the class described, a frame having rear supporting wheels, a front axle, spindles pivoted to the front axle, steerable wheels on the spindles, arms on the spindles, a tie rod connecting said arms, a tongue, means for connecting the tongue with the front axle, comprising pairs of forwardly converging bars, the members of said pairs being arranged to overlie and underlie the axle respectively at their rear ends and to overlap the respective members of the other pair at their forward ends, bolts for connecting the members of each pair in front and behind the axle, a spacer bar mounted on certain of said bolts for folding the rear ends of said bars at fixed distances from each other, a universal joint device for connecting the tongue with the forward ends of said bars for vertical and horizontal pivotal movement, and means for connecting the steerable wheels with the tongue forwardly of said pivot structure, whereby the wheels may be steered according to the horizontal movement of the tongue.

2. In a structure of the class described, a frame having spaced longitudinal members and spaced transverse members, a rear axle, a spring for supporting the rear part of the frame on the rear axle, wheels on the rear axle, springs for supporting the front portion of the frame on the front axle, spindles pivoted to the front axle ends, steerable wheels on the spindles, arms connected with said spindles, a tie rod connecting said arms, a tongue secured to said axle for horizontal, pivotal movement, and means for operatively connecting said front wheels with the tongue, radius rods projecting forwardly and inclined toward each other from the rear axle, a wishbone radius rod device connected with the front axle and extending rearwardly therefrom, a hanging yoke extending between the longitudinal frame members, means for securing the rear end of said wishbone radius rod structure with said yoke, a transverse member connecting the horizontal members, means for connecting the forward ends of said first radius rods with said transverse member, and means for rigidly connecting said yoke and said transverse frame member.

3. In a structure of the class described, a wheel supported frame having an I-beam front axle and steerable front wheels, forwardly converging pairs of bars, the members of each pair being arranged to overlie and underlie the axle respectively at their rear ends and to overlap the respective members of the other pair at their forward ends, bolts for connecting the members of each pair in front and behind the axle, a spacer bar mounted on certain of said bolts for holding the rear ends of said bars at fixed distances from each other having its central portion shaped to engage the axle above its lower flange and a tongue connected with the forward ends of said bars.

Des Moines, Iowa, October 29, 1927.

FRANK J. DULTMEIER.